INVENTOR
R. W. KETCHLEDGE
BY
ATTORNEY

COMMUNICATION SWITCHING SYSTEM

Filed Oct. 19, 1956 2 Sheets-Sheet 2

INVENTOR
R. W. KETCHLEDGE
BY [signature]
ATTORNEY

United States Patent Office 2,859,284

Patented Nov. 4, 1958

2,859,284

COMMUNICATION SWITCHING SYSTEM

Raymond W. Ketchledge, Whippany, N. J., assignor to Bell Telephone Laboratories, Incorporated, New York, N. Y., a corporation of New York Application October 19, 1956, Serial No. 617,189

13 Claims. (Cl. 179—18)

This invention relates to switching networks and, more particularly, to such networks for use in telephone distribution systems wherein a path is established through the network on conduction through a selected number of switching devices operable on application of suitable marking potentials to the network and across the switching devices of the network, which devices are referred to as crosspoints of the switching network.

In Patent 2,684,405, issued July 20, 1954, to E. Bruce and H. M. Straube, there is disclosed a selective switching network for a telephone system in which a plurality of gas tubes are connected together to define individual paths between any one of a number of input terminals to which may be connected telephone subscribers and any one of a number of output terminals which may be trunks. One of these possible paths is established on the application of marking potentials to a particular line and to a particular trunk while suitable marking potentials are applied also to the nodes within the network. A node is defined at each connection of the crosspoints in the network.

In application Serial No. 334,552, filed February 2, 1953, by Bjorn G. Bjornson and E. Bruce, there is disclosed a selective switching network having a general configuration similar to that disclosed in the Bruce-Straube patent. However, in the Bjornson-Bruce application, transistors are employed as the crosspoint devices.

In crosspoint switching networks of these types, the operation is sequential, the crosspoints from one end of the network conducting in succession. In the operation, each crosspoint connected between a vacant output node and a marked input node should conduct or ionize so that there is a fanning out of crosspoints through which conduction exists until the selected other end of the network is reached. As only one trunk at that end is marked, only one complete path will be defined. Conduction in the remaining crosspoints will cease because of lockout or a decrease in potential at the several nodes caused by the flow of current through a high terminal resistance, called the lockout resistor, in the unique path.

In prior circuits employing crosspoint devices, the number of stages and hence the size of the network has been limited. In these prior circuits, the marking potential applied to a vacant node to break down the crosspoints connected to that node is transmitted through the priorly conducting crosspoints in the path and is therefore subject to great variations in value because of variations in the marking voltages of the prior tubes. Necessity for maintaining sufficient margins to prevent erroneous establishment of connections between a path already established and a new path being established and to assure proper establishment of a new connection has limited the number of stages of crosspoints that can be thus operated in tandem.

In my application Serial No. 426,338, filed April 29, 1954, there is disclosed a propagator circuit interposed in a crosspoint switching network. This propagator circuit is positioned, in this particular instance, adjacent to the match stage. This circuit includes a semiconductor diode and a path connected in parallel with the semiconductor diode. This parallel path includes a capacitor, the starter and one main gap electrode of a three-element gas tube and a resistor. The semiconductor diode is normally back-biased by the applied potentials. In response to a mark pulse coming from the terminal of the network, a pulse is fed through the capacitor to the starter electrode of the three-element gas tube. In response to this pulse, the gas tube is ionized and a direct current path is established between the source of anode potential and the subsequent stage of crosspoint devices connected to the cathode of the gas tube, thus applying a new mark signal to the subsequent stage of the network.

These three-element gas tubes, however, are relatively expensive. Further, in prior crosspoint networks, no safety provision has been provided for the possibility of a shorted crosspoint device.

If a crosspoint device were to become shorted, a relatively large amount of current would flow through the device. A large portion of this short-circuit current will flow through other crosspoint devices connected to the nodes associated with the shorted device. These large currents, if allowed to persist, would result in shorting out other crosspoint devices.

Accordingly, it is an object of this invention to provide an improved propagator circuit.

It is another object of this invention to provide a propagator circuit employing only passive elements. Thus, it is an object of this invention to reduce the cost of propagator circuits by eliminating the need for gaseous discharge devices therein.

It is another object of this invention to provide safety devices for faults in the distribution network.

Briefly, in accordance with aspects of this invention, a propagator circuit employing a serially connected resistor and a capacitor and a parallel connected semiconductor diode is interposed between stages of the crosspoint network. A battery or suitable source of potential is connected across the capacitor to maintain the capacitor in a normally charged condition. In response to an incoming marking pulse, the capacitor is discharged into the subsequent stage of the network, which discharge is superimposed on the higher direct current potential existing on the output side of the capacitor, thereby applying a new marking pulse to the subsequent stage.

Advantageously, in accordance with other aspects of this invention, a diode clamping circuit is connected to the output terminal of the propagator circuit to perform the dual function of limiting the marking voltage supplied to the subsequent stage and provide a safety feature for the network against the posibility of a shorted crosspoint device.

Accordingly, it is a feature of this invention to utilize a serially connected resistor and condenser between crosspoint stages to generate a new mark signal in a distribution network by normally maintaining the condenser in a charged condition and discharging the condenser into the subsequent stage in response to an incoming mark pulse.

It is another feature of this invention to connect a clamping circuit to the output terminals of a propagator circuit to limit the marking pulse as well as to by-pass excessive voltages resulting from faults in the crosspoint network.

A complete understanding of this invention and of these and various other features thereof may be gained from consideration of the following detailed description and the accompanying drawing in which.

Figure 1:
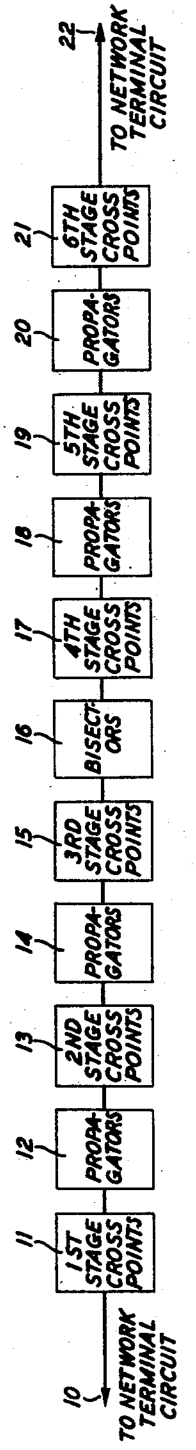
Fig. 1 is a block diagram of a crosspoint distribution network of the type in which this invention may be employed.

Referring now to Fig. 1, there is depicted a distribution network in which terminals 10 and 22 are connected to terminals of the crosspoint network. Block 11 represents the first stage of the crosspoint network while block 12 represents one propagator circuit which may, for example, be of the type depicted in my application Serial No. 426,338, filed April 29, 1954 or in application Serial No. 617,060, filed October 19, 1956, of K. S. Dunlap and J. P. Taylor. Block 20 might also be of this same type propagator for reasons which will be subsequently explained. Blocks 13, 15, 17, 19, and 21 are crosspoint stages similar to the stage depicted by block 11 and may include gas tubes or transistors. Blocks 14 and 18 are propagator circuits and may advantageously be of the passive type in accordance with this invention. Bisector 16 defines the mid-point of the network, at which mid-point the unitary path is completed.

In order to establish a communications path through the network, marking pulses are applied to terminals 10 and 22. These pulses cause the crosspoint devices of the first and sixth stages, respectively, to become conducting. In response to the first stage becoming conducting, a pulse is applied to the propagators contained in block 12 and these propagators transmit a new mark pulse to the second stage crosspoints contained in block 13. This pulse marks the devices of the second stage not connected to an established path and transmits a pulse to the propagators contained in block 14. These propagators transmit a new mark pulse to mark the third stage crosspoint devices, thus establishing a path between terminal 10 and bisector 16. Since the network is symmetrical about the bisector, the pulse applied to terminal 22 establishes a path to the other side of bisector 16.

Figure 2:
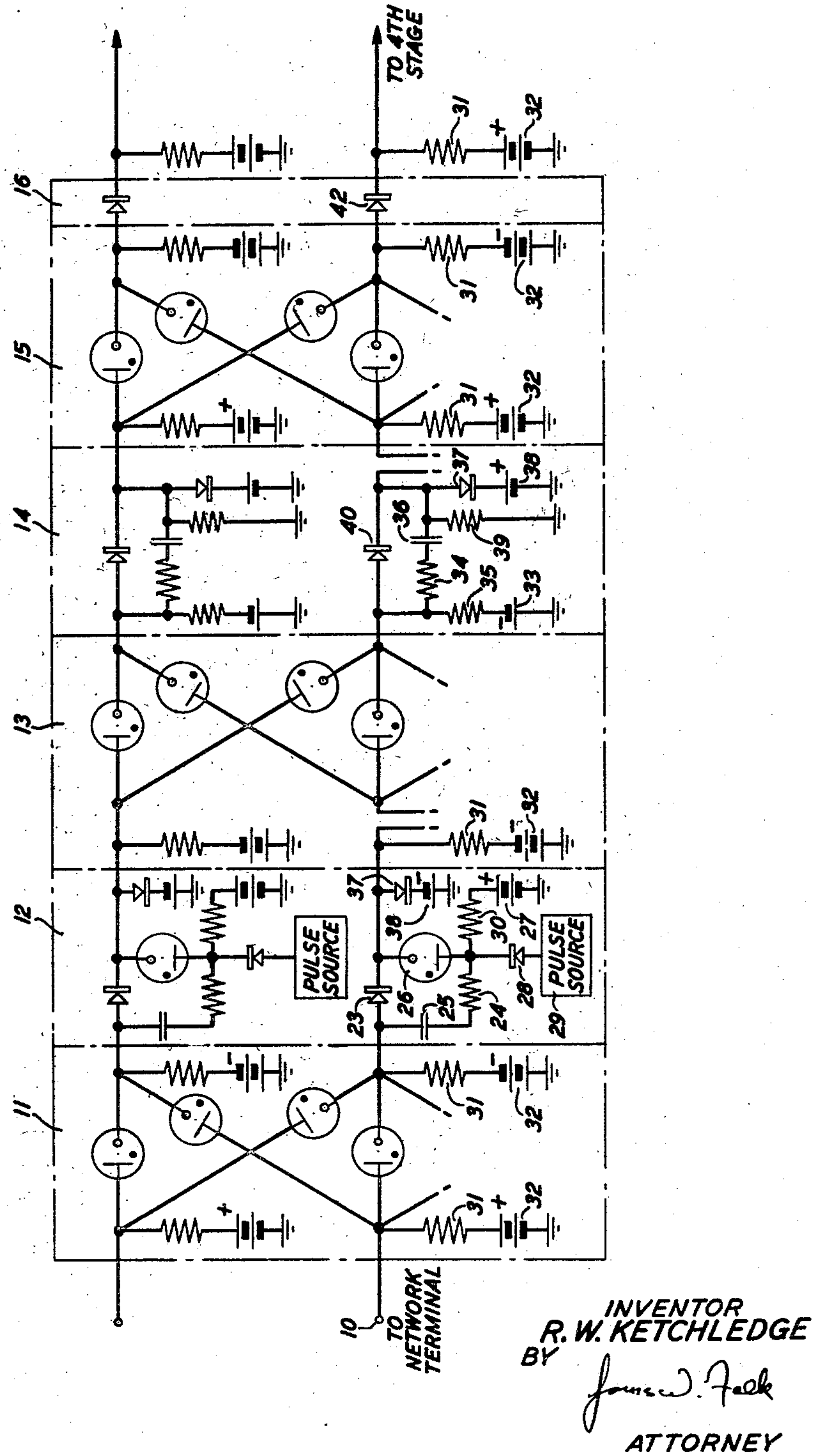
Fig. 2 is a schematic representation of a portion of the block diagram of Fig. 1 including one specific illustrative embodiment of applicant's invention.

Turning now to Fig. 2, there is depicted in schematic form a portion of the distribution network of Fig. 1. Three stages of the network are represented as crosspoint gas diodes. However, these stages may be transistors as was previously explained. Enclosed in block 12 of Fig. 2 is a propagator circuit of the type disclosed more fully in K. S. Dunlap and J. P. Taylor application Serial No. 617,060, filed October 19, 1956. This propagator circuit includes a serially connected semi-conductor diode 23, which is normally back-biased, resistor 24, capacitor 25 and gas diode 26 which combine with source 27, semiconductor diode 28 and pulse source 29 together with resistor 30 to control the regeneration and transmission of a new mark signal. This signal is controlled by the pulse derived from the marking voltage shift of the first stage crosspoints and is transmitted to the second stage crosspoints as a full new mark signal. Isolating resistors 31 connect the various points in the distribution network to different points of potential on biasing battery 32. Resistors 31 may be of high values of resistance and the potential across each crosspoint device may be above the sustain potential of the device to insure automatic deionization of those crosspoint devices not in the single or unitary selected path through the network, as disclosed in application Serial No. 617,087, filed October 19, 1956, of K. S. Dunlap, or node marking and disconnect switches may be utilized with the sources 32 as is known in the art and disclosed in the above-mentioned Bruce-Straube patent.

Enclosed in block 14 is a propagator circuit, in accordance with one specific illustrative embodiment of this invention, which is identical with that represented by block 18 of Fig. 1. Connected between the second stage devices contained in block 13 and the third stage devices contained in block 15 is a semiconductor diode 40. Connected in parallel with diode 40 is a series circuit containing resistor 34 and capacitor 36. A source of potential 33 is connected through resistor 35 to one side of diode 40 and normally maintains diode 40 in a back-biased condition. Source 33 is also connected through ground and resistor 39 to the other side of capacitor 36 and normally maintains capacitor 36 in a charged condition; resistor 34 is advantageously small compared to resistors 35 and 39. Diode 37 and source 38 of potential comprise a clamp or limiting circuit as well as a safety device for shorted crosspoints or other causes of excessive voltage.

The basic operation of the propagator circuit contained in block 14 is to receive a pulse in response to the marking of the crosspoint devices in the second or preceding stage contained in block 13 and retransmit this marking pulse to the third or subsequent stage crosspoint devices contained in block 15. In response to the marking of one of the devices in the second stage, a pulse is transmitted through resistor 34 to capacitor 36 and, since this capacitor is normally maintained in a charged condition, capacitor 36 is discharged into the third stage crosspoint devices thereby delivering a new mark pulse to the third stage devices. Capacitor 36 supplies the additional marking voltage to insure that a complete mark signal is transmitted. The magnitude of the new marking pulse delivered by the propagator is limited by diode 37 in conjunction with source 38. In response to the marking of certain crosspoint devices in the third stage of the network, the back-bias normally applied to diode 40 is overcome by a forward bias and transmission currents can now flow through diode 40. A similar technique is employed to establish a path from terminal 22 of Fig. 1 to bisector 16, which in this particular instance may comprise a diode 42 as shown in Fig. 2, the marking pulse applied to terminal 22 being propagated by propagators 20 and 18, respectively. Thus, a unique path is established through the network. After the unique path is established through the network, a terminal-to-terminal network direct current flows. This network current flows through a high terminal resistor, commonly called the lockout resistor, causing a high potential drop. In response to this high potential drop, the crosspoint devices in the unselected paths are locked out and become nonconducting.

After the transmission has been completed through the unique path thus established through the distribution network, this path may be disestablished by the application of pulses of opposite polarity to the terminals of the network from those previously employed to establish the path through the network. The disconnect pulses need only render one crosspoint device in the unique path nonconducting to disestablish the path. It is thus unnecessary for the disconnect pulses to pass through the propagator circuits.

Bisector 16 is herein depicted as diode 42, which diode permits the application of a complementary group of potentials on either side of the bisector thereby permitting both the circuitry and the applied potentials to be symmetrical about the bisector. For example, all the anodes of the crosspoint devices may be connected on the side adjacent the network terminals while the cathodes of these crosspoint devices are connected closest to the bisector.

Assume now for the purposes of a more detailed explanation of the operation of the distribution network that there are no priorly established calls through the network and that a path is to be established between terminal 10 and terminal 22 of Fig. 1. On the basis of these assumptions, marking pulses are applied to terminals 10 and 22. Since the network is symmetrical about the bisector, reference will be made to Fig. 2 to explain the mode of operation in establishing a path between terminal 10 and diode 42 of the bisector circuit. It is understood that the operation will be identical with that between terminal 22 and diode 42 of the bisector.

The marking pulse applied to terminal 10 in combination with the sustain voltage normally applied across stage 11 causes the tubes in stage 11, not connected to a busy circuit, to be ionized. In response to the ionization of this stage, a pulse is delivered through capacitor 25. This mark pulse is differentiated by capacitor 25 and resistor 30 and applied as a sharp pulse of increased magnitude to the anode of diode 28 overcoming the back-bias normally applied to diode 28 by source 27 and applying a forward bias. If a nonselective propagator mark pulse is applied from pulse source 29 to diode 28 while this diode is forward biased, propagator gas diode 26 will ionize. This ionization effectively closes the circuit between pulse source 29 and subsequent stage 13. In response to the closure of this path, a new mark pulse is delivered from pulse source 29 to the second stage, which pulse is limited in magnitude by the diode clamp connected to the propagator output terminal. This clamping circuit also provides network protection against excessive voltages which might occur, for example, if one of the crosspoint devices becomes short-circuited.

In response to the marking of the second stage crosspoints, a pulse is transmitted through resistor 34 to capacitor 36. Capacitor 36, being normally charged by source 33, discharges into the subsequent stage of crosspoints which, in this particular instance is the third stage. Capacitor 36 supplies the additional required charge or voltage to insure that a full mark signal is applied to the third stage. This marking pulse ionizes or marks the crosspoint devices of the second stage contained in block 15, establishing a path from network terminal 10 to bisector diode 42. In response to the similar application of a marking pulse to terminal 22 of the network, a similar path is established to the opposite side of bisector diode 42, thus completing a unique path through the distribution network as was previously explained. The direct current flowing through a large terminal resistor in the established path causes lockout or deionization of the previously ionized crosspoints in the unselected paths. Transmission currents may now be superimposed on the direct current of the unique path and pass between terminals 10 and 22 through diode 42 permitting communications in both directions. After the transmission has been completed, the unique path is disestablished by the application of pulses to the network terminals opposite in polarity to the network terminal mark pulses previously employed.

Figure 3:
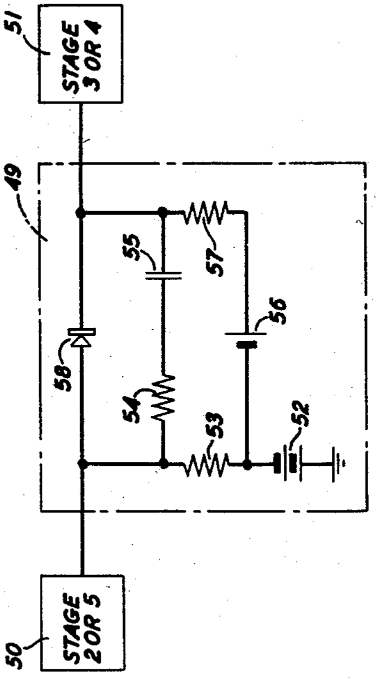
Fig. 3 is a schematic representation of another specific illustrative embodiment of this invention.

Referring now to Fig. 3, there is depicted another specific illustrative embodiment of a passive propagator circuit in accordance with this invention. Block 49 depicts the propagator circuit located between the crosspoint stages enclosed in blocks 50 and 51 of the distribution network. As herein depicted, block 50 represents the preceding stage and block 51 represents the subsequent stage in that block 50 is on the terminal side of the propagator circuit while block 51 is on the bisector side of the propagator circuit. Source 52 of negative potential is connected to the input terminal of the propagator through resistor 53 and this source is connected to capacitor 55 through resistor 54. Source 56 is connected intermediate source 52 and resistor 53 as well as to the opposite terminal of capacitor 55 through resistor 57. Diode 58 is the series semiconductor diode which is normally back-biased in the propagator circuit and compares with diode 40 in Fig. 2.

In response to an incoming mark pulse from stage 50, a pulse passes through resistor 54 to capacitor 55 causing capacitor 55 to discharge into subsequent stage 51. Capacitor 55 supplies the additional marking voltage to insure that a complete mark signal is transmitted to the subsequent stage. In response to the marking or ionization of the stage contained in block 51, current flows through resistor 57 as well as through resistor 54 and capacitor 55 causing the output terminal of the propagator circuit to be lower in potential than the input terminal of the propagator, thus removing the back-bias on diode 58 and causing diode 58 to be biased in a forward direction.

By charging the capacitor 55 to the potential of source 56, the incoming mark signal is delivered to the output terminal at a value which is greater than the incoming signal by the potential of source 56. It is apparent that condenser 55 charges through the combination of resistors 53, 54, and 57 but discharges primarily through resistor 54. Advantageously, the time constants and current drains of the charge and discharge circuits are so related as to allow the mark propagator to recover, that is, the condenser to be recharged sufficiently between marking operations.

In each of the embodiments of passive propagator circuits depicted in this application, a new marking pulse is delivered to the subsequent stage of the network, which marking pulse is somewhat limited as to the value of current available. This necessarily restricts the number of crosspoints in the subsequent stage which are ionized. This limitation on the fanout current facilitates the establishment of a unique path by limiting the number of unused crosspoints which are ionized or marked. The discharge path impedance includes resistor 54 of Fig. 3 which facilitates the obtaining of lockout. The ionization of the subsequent stage produces large current flow and thereby a large voltage drop across the capacitor discharge resistor, which in Fig. 3 is resistor 54. The resultant decrease in the propagator output voltage prevents the establishment of multiple paths through the network. Association of a corresponding impedance with the network terminal circuits 10–22 would result in excessive voltage drops for satisfactory marking operations because of excessive fanout currents.

It is to be understood that the above-described arrangements are illustrative of the application of the principles of the invention. Numerous other arrangements may be devised by those skilled in the art without departing from the spirit and scope of the invention.

What is claimed is:

1. A communications switching circuit comprising a plurality of input lines, a plurality of output lines, crosspoint devices arranged in stages interconnecting each of said input and output lines, means for establishing a path between a selected one of said input lines and a selected one of said output lines including means for applying marking voltages to said selected input and output lines, and passive propagator means interposed between two stages of said crosspoint devices for applying an accurate mark voltage to the succeeding stage crosspoint devices on receipt of a smaller mark voltage from a preceding stage crosspoint device, said last-mentioned means including a resistor and a condenser connected in series between said preceding stage and said succeeding stage, means for maintaining said condenser in a normally charged condition, means including said preceding stage for discharging said condenser into said succeeding stage, and diode means connected between said two stages and across said series connected resistor and condenser.

2. A communications switching circuit in accordance with claim 1 further including diode clamping means connected between said propagator means and subsequent stage and wherein said means for charging said condenser includes a source of potential connected across said condenser.

3. A communications switching circuit comprising a plurality of input lines, a plurality of output lines, a plurality of crosspoint devices arranged in stages interconnecting each of said input and output lines, means for establishing a path between a selected one of said output lines and a selected one of said input lines including means for applying marking potentials to said selected input and said selected output lines, and passive propagator means interposed between two stages of said crosspoint devices for applying an accurate mark voltage to the succeeding stage crosspoint devices on receipt of a smaller mark voltage from a preceding stage crosspoint device, said last-mentioned means including a resistor and a condenser serially connected between said preceding stage and said succeeding stage, means for normally maintaining said condenser in a charged condition, diode means connected in parallel with said resistor-condenser series circuit, said diode being normally back-biased, and means including said marking means for discharging said condenser into the succeeding stage in response to the receipt of a marking signal from the preceding stage whereby said diode is forward biased in response to the marking of said succeeding stage.

4. A communications switching circuit in accordance with claim 3 wherein said charging means includes a voltage source, a first and a second resistor connected respectively between said voltage source and each of the terminals of said condenser and wherein the recharging time of the serially connected resistor-condenser circuit is such that said condenser recharges between successive marking operations.

5. A propagator circuit between adjacent stages of crosspoints in a crosspoint switching network including a capacitor and a resistor serially connected between said adjacent stages of crosspoints, a diode connected in parallel with said resistor-capacitor series circuit, means maintaining said diode in a normally back-biased condition, said last-mentioned means maintaining said capacitor in a normally charged condition, and means including one of said crosspoint stages for discharging said capacitor into another of said crosspoint stages whereby a new marking pulse is delivered to said other crosspoint stage in response to the marking of said one crosspoint stage.

6. A pulse propagator circuit between successive stages of crosspoint devices in a crosspoint switching network including a capacitor serially connected between said stages, a charging circuit for normally maintaining said capacitor in a charged condition, normally back-biased diode means connected in parallel with said capacitor, and means including one of said stages for causing said capacitor to discharge into another of said stages thereby delivering a pulse to said another stage.

7. A propagator circuit in accordance with claim 6 wherein said charging circuit has a time constant such that said condenser recharges between successive marking operations.

8. A propagator circuit for a crosspoint switching network comprising a resistor and a condenser connected in series between adjacent stages of the network, means for maintaining said condenser in a normally charged condition, means for discharging said condenser into the succeeding stage of the network on receipt of a marking voltage from the preceding stage of the network, and diode means connected in parallel across said resistor and condenser and normally back-biased by said means for maintaining said condenser in a normally charged condition.

9. A propagator circuit in accordance with claim 8 wherein said means for maintaining said condenser in a normally charged condition comprises a voltage source and resistors across said series connected condenser and resistor.

10. A propagator circuit in accordance with claim 9 further comprising a second voltage source connected to said series connected condenser and resistor at the side thereof adjacent the preceding stage of the network.

11. A propagator circuit in accordance with claim 9 wherein said voltage source is connected also between the preceding stage of the network and a reference potential.

12. A propagator circuit in accordance with claim 11 further including diode clamping means connected to said series connected resistor and condenser and to the succeeding stage of the network.

13. A passive propagator circuit for interposition between two stages of a crosspoint switching network to apply an accurate mark voltage to the succeeding stage crosspoint devices on receipt of a smaller mark voltage from a preceding stage crosspoint device comprising a series connected condenser and resistor, means for normally maintaining said condenser in a charged condition, diode means connected in parallel with said condenser and resistor and being normally back-biased, and means for discharging said condenser into the succeeding network stage in response to the receipt of a marking signal from the preceding stage, whereby said diode is forward biased in response to the marking of the succeeding stage.

References Cited in the file of this patent

UNITED STATES PATENTS

| | | |
|---|---|---|
| 2,722,567 | Davison et al. | Nov. 1, 1955 |
| 2,779,822 | Ketchledge | Jan. 29, 1957 |
| 2,780,674 | Six et al. | Feb. 5, 1957 |